US012431616B2

(12) United States Patent
Sukegawa

(10) Patent No.: US 12,431,616 B2
(45) Date of Patent: Sep. 30, 2025

(54) ANTENNA APPARATUS AND RADOME

(71) Applicant: NEC Corporation, Tokyo (JP)

(72) Inventor: Tsuyoshi Sukegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 155 days.

(21) Appl. No.: 18/511,147

(22) Filed: Nov. 16, 2023

(65) Prior Publication Data

US 2024/0178557 A1 May 30, 2024

(30) Foreign Application Priority Data

Nov. 28, 2022 (JP) ................................ 2022-188864

(51) Int. Cl.
*H01Q 1/42* (2006.01)
*H01Q 1/02* (2006.01)

(52) U.S. Cl.
CPC ................ *H01Q 1/42* (2013.01); *H01Q 1/02* (2013.01)

(58) Field of Classification Search
CPC .. H01Q 1/02; H01Q 1/42; H01Q 1/52; H01Q 21/065
See application file for complete search history.

(56) References Cited

FOREIGN PATENT DOCUMENTS

| | | | | |
|---|---|---|---|---|
| KR | 1020220097852 A | * 7/2022 | ............... | H01Q 1/02 |
| KR | 1020220078499 A | * 10/2022 | ............... | H01Q 1/02 |
| WO | 2022/176285 A1 | 8/2022 | | |

* cited by examiner

*Primary Examiner* — Hoang V Nguyen

(74) *Attorney, Agent, or Firm* — Sughrue Mion, PLLC

(57) ABSTRACT

An antenna apparatus according to the present disclosure includes a conductive plate including a feeder circuit, and a radome including a first case being disposed on a first surface side of the conductive plate and having thermal conductivity and a second case being disposed on a second surface side on an opposite side of the first surface and having thermal conductivity. The feeder circuit includes a feed line being connected to an antenna member, and a ground portion surrounding the feed line and being connected to the feed line via a short stub. The first case includes a cover portion being disposed apart from the feed line and the short stub, and a first support portion being connected to the ground portion and including a heat radiation fin.

18 Claims, 9 Drawing Sheets

ANTENNA APPARATUS AND RADOME

INCORPORATION BY REFERENCE

This application is based upon and claims the benefit of priority from Japanese patent application No. 2022-188864, filed on Nov. 28, 2022, the disclosure of which is incorporated herein in its entirety by reference.

TECHNICAL FIELD

The present disclosure relates to an antenna apparatus and a radome.

BACKGROUND ART

An active antenna system (AAS) aiming at spatial multiplexing has been studied because of a demand for large-capacity communication.

In the AAS, since each transceiver is disposed for each antenna element, power consumption increases, and heat radiation of an antenna apparatus becomes a major problem.

Further, in a related antenna-integrated base station apparatus, it is necessary to cover an antenna element by using a resin radome in order to protect the antenna element. In this case, the resin radome hinders heat radiation of the base station apparatus. In addition, by providing the resin radome, it is not possible to provide a heat radiation mechanism on an antenna surface on which the antenna element is disposed. Therefore, it is necessary to concentrate the heat radiation mechanism on a rear surface side of the base station apparatus, resulting in an increase in size of the base station apparatus.

In order to solve such a problem, International Patent Publication No. WO2022/176285 proposes that, in an antenna constituted of a primary resonator and a sub-resonator, the sub-resonator of the antenna and a radome protecting the antenna are constituted of the same metal. Then, International Patent Publication No. WO2022/176285 proposes a structure in which a heat radiation path from an active element is provided in a printed substrate and the radome. As a result, a radome surface can be provided with a heat radiation fin that radiates heat from an antenna surface, and thereby efficiency of heat radiation of a base station apparatus is improved. Therefore, a size of the base station apparatus can be decreased.

In a second example embodiment of International Patent Publication No. WO2022/176285, an antenna element functioning as a part of a heat radiation path from an active element to a heat radiation fin and a feed line to the antenna element are formed on a printed substrate. However, even in such a configuration, heat radiation performance is not yet sufficient.

SUMMARY

An example object of the present disclosure has been made in order to solve the problem described above, and is to provide an antenna apparatus and a radome that are capable of improving heat radiation.

In a first example aspect of the present disclosure, an antenna apparatus includes a conductive plate configured to include a feeder circuit, and a radome configured to include a first case being disposed on a first surface side of the conductive plate and having thermal conductivity, and a second case being disposed on a second surface side on an opposite side of the first surface and having thermal conductivity, the feeder circuit includes a feed line being connected to an antenna member, and a ground portion surrounding the feed line and being connected to the feed line via a short stub, the first case includes a cover portion being disposed apart from the feed line and the short stub, and a first support portion being connected to the ground portion and including a heat radiation fin, and the second case includes a bottom portion being disposed apart from the feed line and the short stub and transferring heat from an active component, and a second support portion being connected to the ground portion.

In a second example aspect of the present disclosure, a radome includes a first case configured to be disposed on a first surface side of a conductive plate having a feeder circuit and have thermal conductivity, and a second case configured to be disposed on a second surface side on an opposite side of the first surface and have thermal conductivity, the feeder circuit includes a feed line being connected to an antenna member, and a ground portion surrounding the feed line and being connected to the feed line via a short stub, the first case includes a cover portion being disposed apart from the feed line and the short stub, and a first support portion being connected to the ground portion and including a heat radiation fin, and the second case includes a bottom portion being disposed apart from the feed line and the short stub and transferring heat from an active component, and a second support portion being connected to the ground portion.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

Figure 1:
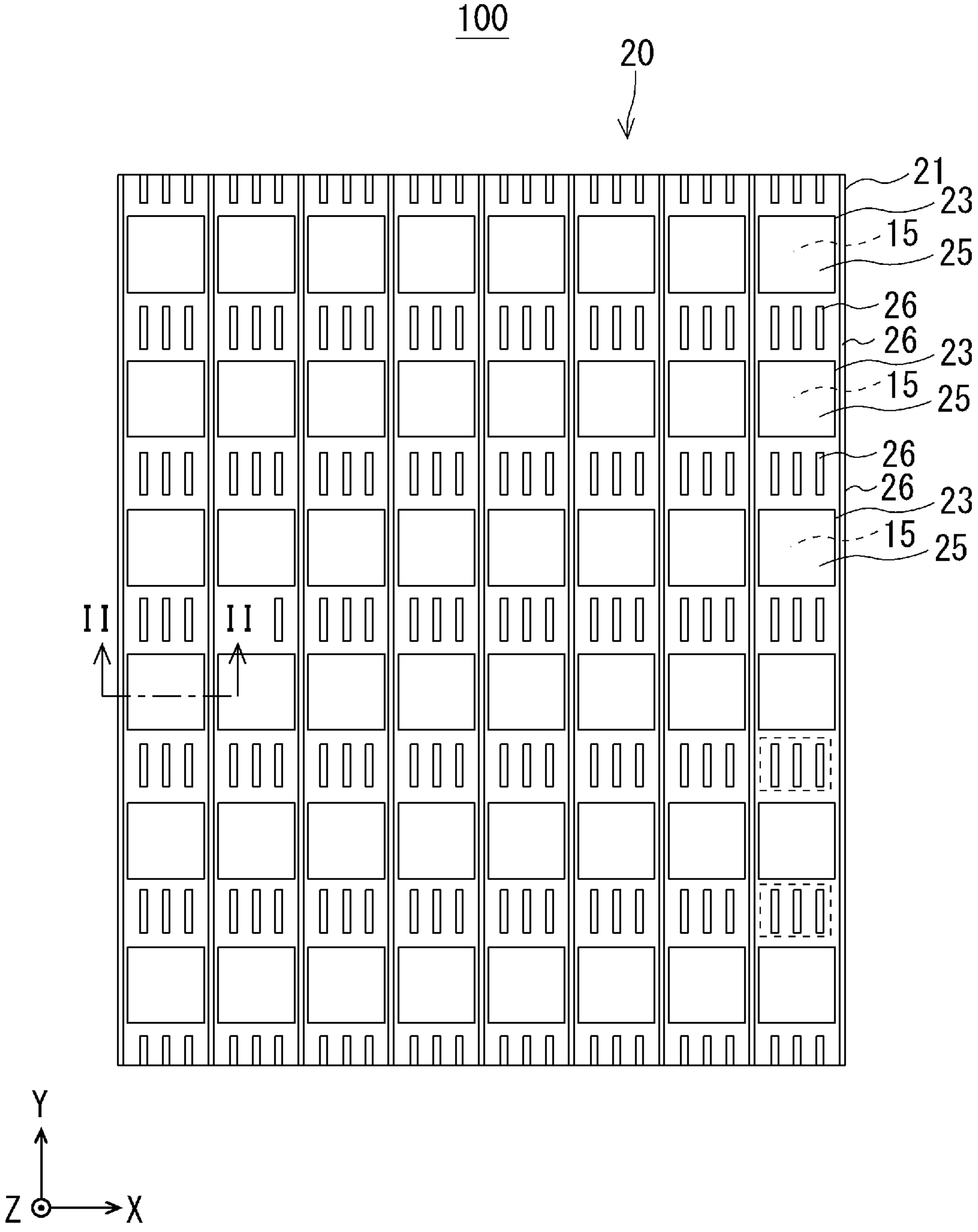
FIG. 1 is a top view illustrating an antenna apparatus according to a first example embodiment.

Hereinafter, example embodiments of the present disclosure will be described with reference to the drawings. Note that, the following description and the drawings are omitted and simplified as appropriate for clarity of description. In addition, in the following drawings, the same elements are denoted by the same reference signs, and redundant descriptions are omitted as necessary.

(Consideration Leading to Example Embodiments)

First, before describing details of the example embodiments, consideration leading to the example embodiments will be described. An AAS is known as an antenna apparatus used for fifth-generation mobile communication. The AAS enables flexible beamforming, massive multiple input multiple output (massive-MIMO), multi user-MIMO (MU-MIMO), and the like by providing a transceiver for each antenna element constituting a super multi-element antenna array. As a result, since the AAS can spatially multiplex and collectively transmit a radio signal of a plurality of communication terminals and a plurality of layers, a cell throughput can be greatly improved and frequency utilization efficiency can be improved.

The AAS having a full digital beamforming function enabling MU-MIMO is provided, associated to each antenna, with a transceiver including an analog to digital converter (ADC), a digital to analog converter (DAC), a transmitter and receiver (TRX), and a radio frequency frontend (RF frontend). Therefore, since the number of transceivers increases in response to the number of antennas, electric power consumption in the AAS also increases as the number of antenna elements and the number of transceivers increases. Accordingly, a heat radiation measure and a decrease in size and weight become large design problems.

As described above, in general, an antenna-integrated base station apparatus uses a resin radome in order to protect an antenna element or the like. As described above, the resin radome hinders heat radiation of the antenna apparatus. Since the AAS includes a large number of antenna elements, an area of an array antenna is also increased. Therefore, when a resin radome is used for the AAS, a radiator fin is provided in a housing provided on a rear surface side on an opposite side of an antenna surface of the AAS, and heat radiation is performed by increasing a height of the fin and the number of the fins. Therefore, when a resin radome is adopted for the AAS, an envelope volume of the heat radiation fin in the AAS is increased, and weight thereof is also increased. As a result, the base station apparatus increases in size.

As described above, in a case where the number of antenna elements is increased and an occupied area of an array antenna is increased in size, when a structure in which the antenna element is sealed with a resin radome is adopted, heat radiation from an antenna surface in an AAS front direction can hardly be expected. Accordingly, there is a problem that it is necessary to increase a height and the number of radiator fins formed in the housing on a back surface side of the antenna, which leads to an increase in weight.

Meanwhile, a forced air cooling system and a natural air cooling system are known as a cooling system for suppressing an increase in temperature of an internal device. The forced air cooling system is a system cooling the internal device, by providing a fan, by pushing external air into the internal device, or by sucking overheated air out of the internal device. The natural air cooling system is a system in which heat is guided to a radiator fin while diffusing the heat from the internal device, then the number of fins and a fin length are secured, a heat radiation area with an external environment is expanded, and thereby heat radiation efficiency is enhanced.

When the forced air cooling system is adopted for the AAS, an effect of heat radiation and a decrease in size can be expected, but it is necessary to drive a fan or the like continuously. Therefore, failure due to continuous driving occurs and leads to a decrease in reliability, and immediate maintenance at a time of the failure is required. In addition, since the AAS is also deployed in an urban area, when the forced air cooling system is adopted for the AAS, a soundproofing measure may be required for rotating sound of the fan depending on an installation environment. Therefore, the AAS preferably adopts the natural air cooling system rather than the forced air cooling system. Therefore, in the AAS, it is desired to increase heat radiation efficiency while achieving a decrease in size and weight even when the natural air cooling system is adopted. The present disclosure provides an antenna apparatus that improves heat radiation efficiency while suppressing an increase in size.

First Example Embodiment

Figure 2:
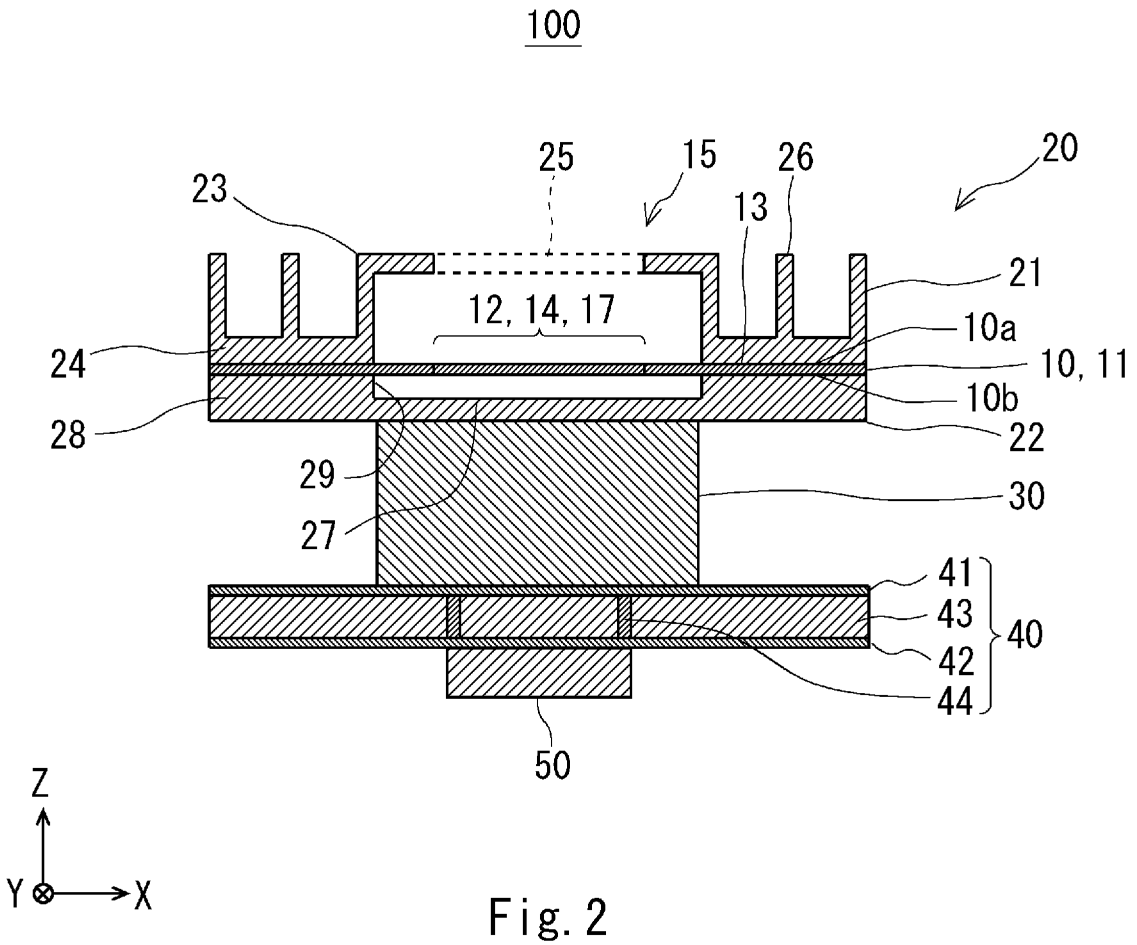
FIG. 2 is an enlarged cross-sectional view illustrating the antenna apparatus according to the first example embodiment, and is an enlarged cross-sectional view illustrating a part of a cross-sectional view taken along a cutting line II-II in FIG. 1.
Figure 3:
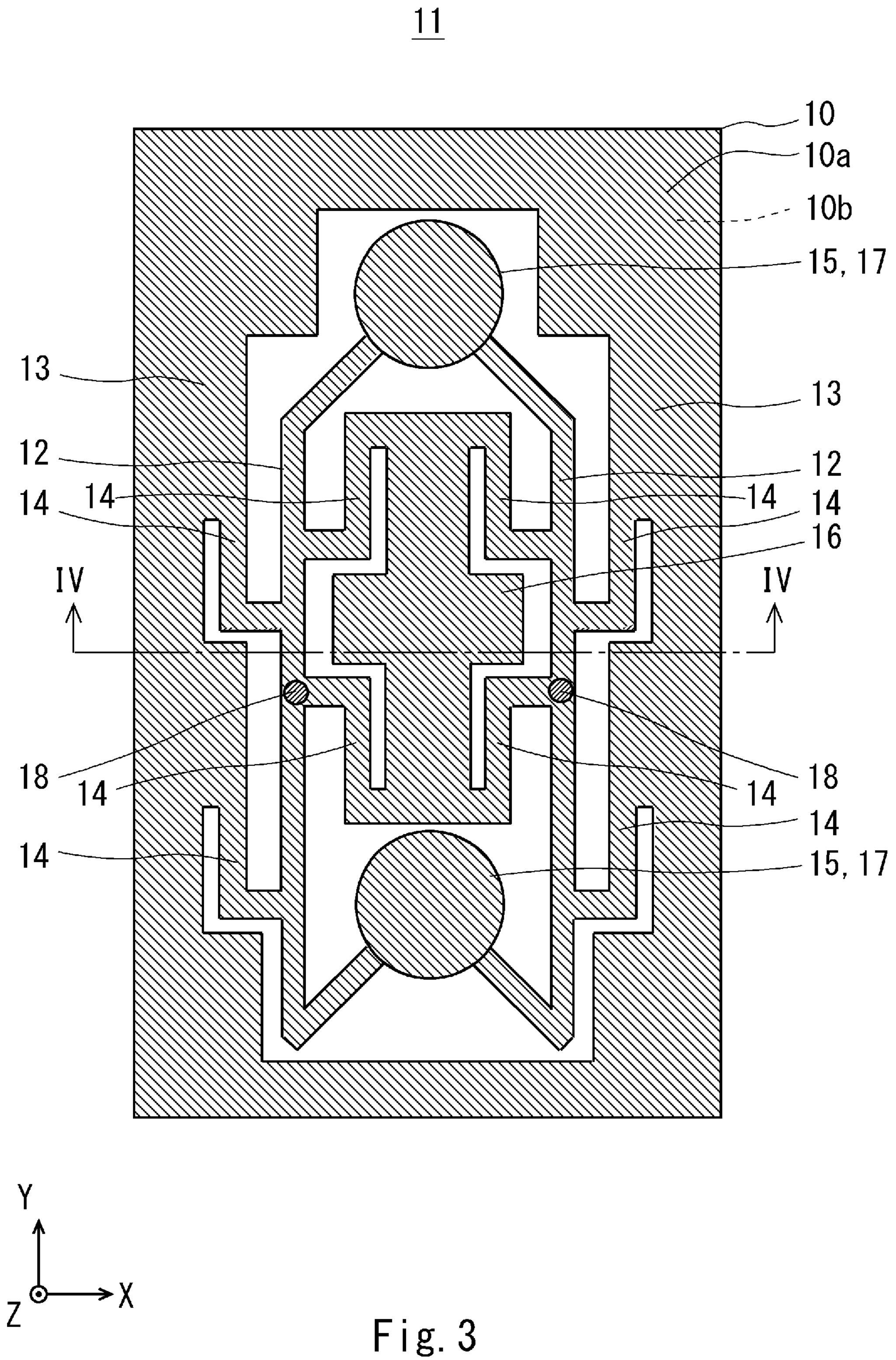
FIG. 3 is a plan view illustrating a feeder circuit according to the first example embodiment.
Figure 4:
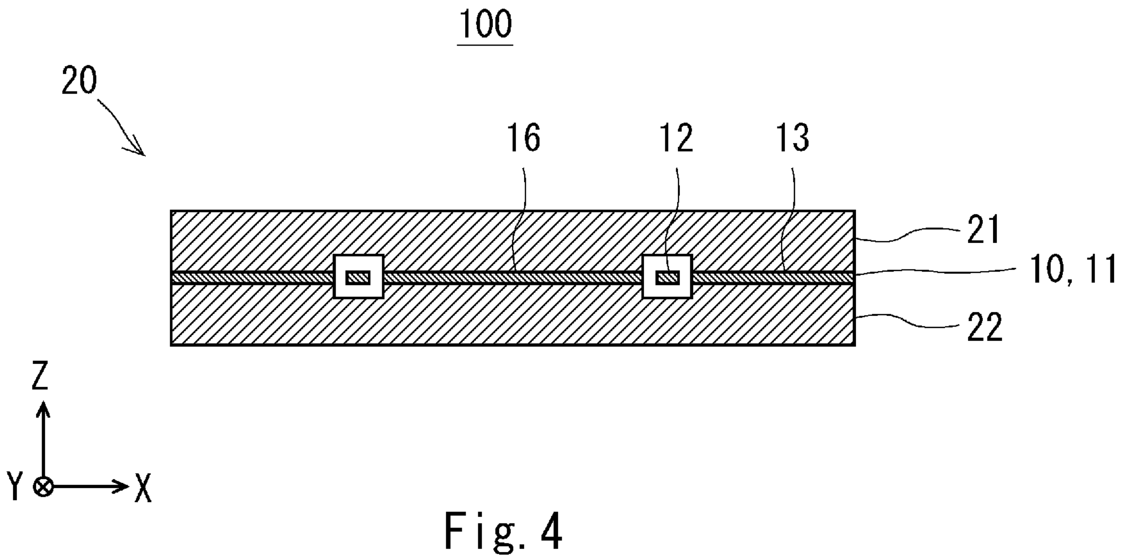
FIG. 4 is a cross-sectional view illustrating the feeder circuit according to the first example embodiment, and is an enlarged cross-sectional view illustrating a part of a cross-sectional view taken along a cutting line IV-IV in FIG. 3.

A configuration example of an antenna apparatus 100 according to a first example embodiment will be described with reference to FIGS. 1 to 4. FIG. 1 is a top view illustrating the antenna apparatus 100 according to the first example embodiment. FIG. 2 is an enlarged cross-sectional view illustrating the antenna apparatus 100 according to the first example embodiment, and is an enlarged cross-sectional view illustrating a part of a cross-sectional view taken along a cutting line II-II in FIG. 1. FIG. 3 is a plan view illustrating a feeder circuit according to the first example embodiment. FIG. 4 is a cross-sectional view illustrating the feeder circuit according to the first example embodiment, and is an enlarged cross-sectional view illustrating a part of a cross-sectional view taken along a cutting line IV-IV in FIG. 3.

Herein, for convenience of description, an XYZ orthogonal coordinate system is introduced, and a +Z-axis direction is assumed to be upward, and a −Z-axis direction is assumed to be downward. In addition, an XY plane is a horizontal plane. Note that, upward, downward, and the horizontal plane are for convenience of description, and do not indicate a direction where the actual antenna apparatus 100 is disposed. For example, FIG. 2 is a cross-sectional view in a state where a conductive plate 10 is substantially parallel to the horizontal plane, but in a case where the antenna apparatus 100 is operated, the conductive plate 10 may be disposed substantially perpendicularly to the horizontal plane.

As illustrated in FIGS. 1 to 4, the antenna apparatus 100 is an antenna array including a plurality of antenna members 15, and may be, for example, an AAS. Note that, in order not to make the drawings complicated, reference signs of some members are omitted. Since the antenna apparatus 100 includes a plurality of the antenna members 15, the antenna apparatus 100 may be referred to as an antenna system. The antenna apparatus 100 includes the conductive plate 10 and a radome 20. The antenna apparatus 100 may further include a heat transfer member 30, a substrate 40, and an active component 50.

The conductive plate 10 has a plate shape, and includes a first surface **10*a* and a second surface 10*b*. The second surface 10*b* is a surface on an opposite side of the first surface 10*a*. The conductive plate 10 is, for example, a metal plate. Note that, the conductive plate 10 is not limited to a metal plate as long as it has conductivity and thermal conductivity, and may be a non-metal plate such as a conductive resin plate or a conductive ceramic plate. The conductive plate 10 is disposed in such a way that the first surface 10*a* and the second surface 10*b* are parallel to the XY plane. The first surface 10***a* faces upward. Therefore, a first surface 10*a* side is a +Z-axis direction side. The second surface 10*b* faces downward. Therefore, a second surface 10*b* side is a −Z-axis direction side. The conductive plate 10 includes a feeder circuit 11. The conductive plate 10 may include a plurality of the feeder circuits 11. For example, the conductive plate 10 may include the plurality of feeder circuits 11 being disposed side by side in a matrix shape in an X-axis direction and a Y-axis direction.

The feeder circuit 11 includes a feed line 12, a ground portion 13, a short stub 14, and an antenna element 17. In the present example embodiment, the antenna member 15 includes the antenna element 17. The feeder circuit 11 may further include an internal ground portion 16. The feeder circuit 11 may be formed by printing the feed line 12, the ground portion 13, the short stub 14, the antenna element 17, and the internal ground portion 16 on the conductive plate 10.

The feed line 12 is formed on the conductive plate 10. The feeder circuit 11 may include a plurality of the feed lines 12. The feed line 12 has, for example, a portion extending in the Y-axis direction. The feed line 12 includes a feed point 18. The feed line 12 is connected to the antenna element 17 being the antenna member 15. The feed line 12 performs electric power supply to the antenna element 17. Specifically, electric power supply to the antenna element 17 is performed from the feed point 18 via the feed line 12. The ground portion 13 is disposed around the feed line 12. The feed line 12 is surrounded by the ground portion 13. The plurality of feed lines 12 may be disposed inside the ground portion 13 and surrounded by the ground portion 13. The feeder circuit 11 including the feed line 12 may be formed on the conductive plate 10 by, for example, a stripline. By using stripline structure for the feed line 12, it is possible to further improve heat radiation efficiency. The feed line 12 is connected to the ground portion 13 via a plurality of the short stubs 14.

The ground portion 13 is formed on the conductive plate 10. The ground portion 13 surrounds the feed line 12, and is connected to the feed line 12 via the short stub 14. In other words, the feed line 12 and the ground portion 13 are connected to each other via the plurality of short stubs 14 being disposed in a middle of the feed line 12. The ground portion 13 may have, for example, a portion extending in the Y-axis direction and a portion extending in the X-axis direction. The ground portion 13 may have, for example, a rectangular frame shape.

The ground portion 13 may include a portion connected to a first case 21 and a second case 22 of the radome 20. The first surface 10*a* side of the ground portion 13 is connected to the first case 21, and the second surface 10*b* side of the ground portion 13 is connected to the second case 22. Therefore, the ground portion 13 is configured to be sandwiched between the first case 21 and the second case 22. Accordingly, the first case 21 and the second case 22 function as a ground of the stripline.

The internal ground portion 16 is formed on the conductive plate 10. The internal ground portion 16 may have a rod-shaped portion extending in the Y-axis direction. The internal ground portion 16 is disposed between the plurality of feed lines 12. The internal ground portion 16 is also connected to the feed line 12 via the short stub 14. The internal ground portion 16 may have a portion connected to the first case 21 and the second case 22 of the radome 20. The first surface 10*a* side of the internal ground portion 16 is connected to the first case 21, and the second surface 10*b* side of the internal ground portion 16 is connected to the second case 22. Therefore, the internal ground portion 16 is configured to be sandwiched between the first case 21 and the second case 22. Accordingly, the first case 21 and the second case 22 function as the ground of the stripline.

The short stub 14 is formed on the conductive plate 10. The short stub 14 connects the feed line 12 and the ground portion 13 to each other. The short stub 14 is surrounded by the ground portion 13 together with the feed line 12. The short stub 14 has a portion extending in the Y-axis direction. The short stub 14 may have a portion extending in the X-axis direction. The short stub 14 is selected to have a length of a quarter of a wavelength of a used frequency. As a result, since impedance becomes infinite, the short stub 14 can mechanically hold the feed line 12 without affecting an electrical characteristic of the feed line 12.

The antenna member 15 includes, for example, the antenna element 17. In this case, the antenna element 17 is formed on the conductive plate 10. The antenna element 17 is connected to the feed line 12. Therefore, the antenna element 17 is disposed on the same plane as the feed line 12, the ground portion 13, the short stub 14, and the like. The antenna element 17 is an antenna element 17 that feeds electric power, and is, for example, a patch antenna. The antenna element 17 is a primary resonator for transmitting and receiving a signal by a transceiver (not illustrated) connected to the substrate 40. The antenna apparatus 100 may radiate, by dual resonance between the antenna element 17 and a slot antenna element configured by an opening 25 of the first case 21 described later, a radio wave from the slot antenna element in the +Z-axis direction, and transmit and receive a signal to and from a communication apparatus in the direction.

When the plurality of feeder circuits 11 are disposed in a matrix shape on the conductive plate 10, a plurality of the antenna elements 17 are disposed in a matrix shape. In other words, the plurality of antenna elements 17 may be disposed at a predetermined interval in the X-axis direction, and may be disposed at a predetermined interval in the Y-axis direction.

The radome 20 includes the first case 21 and the second case 22. The first case 21 and the second case 22 have thermal conductivity. The first case 21 and the second case 22 may include a metal material such as aluminum, silver, and copper, for example. Note that, the first case 21 and the second case 22 are not limited to include metal as long as they have thermal conductivity, and may include non-metal such as a thermally conductive resin or a thermally conductive ceramic.

The first case 21 is disposed on the first surface 10*a* side of the conductive plate 10, that is, on the +Z-axis direction side of the conductive plate 10. The first case 21 is fixed to the ground portion 13 of the feeder circuit 11 in a state of covering the feed line 12, the short stub 14, and the like of the feeder circuit 11. The first case 21 functions as a protective member that protects the conductive plate 10. The first case 21 includes a cover portion 23 and a first support portion 24. When the conductive plate 10 includes the plurality of feeder circuits 11, the first case 21 may include a plurality of the cover portions 23.

The cover portion 23 is disposed apart from the feed line 12 and the short stub 14. When the antenna element 17 is formed in the feeder circuit 11, the cover portion 23 is also disposed apart from the antenna element 17. The cover portion 23 may have, for example, a rectangular parallelepiped dome shape. In the cover portion 23, the opening 25 may be formed at a position facing the antenna element 17. In other words, the opening 25 is formed at a position in the +Z-axis direction of each antenna element 17. The opening 25 improves radio wave radiation from the antenna element 17 or radio wave incidence to the antenna element 17. Note that, in order to improve a characteristic of the antenna apparatus 100, an aperture antenna or a slot antenna may be disposed instead of the opening 25.

The first case 21 is electrically connected to the conductive plate 10 on which the feed line 12, the short stub 14, and the antenna element 17 are formed. Since the cover portion 23 is disposed in such a way as to cover the antenna element 17 of each feeder circuit 11, each antenna element 17 is configured to be able to reduce mutual influence with another antenna element 17 including an adjacent antenna element 17. In other words, the cover portion 23 reduces the mutual influence with the another antenna elements 17 on each antenna element 17, and improves the antenna characteristic of the antenna apparatus 100.

The first support portion 24 is disposed on the ground portion 13. The first support portion 24 is connected to the ground portion 13. Note that, the first support portion 24 may be disposed on the internal ground portion 16. The first support portion 24 may be connected to the internal ground portion 16. The first support portion 24 is connected to the cover portion 23, and supports the cover portion 23. The first support portion 24 includes a heat radiation fin 26. The first support portion 24 may include a plurality of the heat radiation fins 26. The heat radiation fin 26 protrudes from the first support portion 24 in the +Z-axis direction, for example. Then, the heat radiation fin 26 protruding in the +Z-axis direction extends in the Y-axis direction.

The heat radiation fin 26 is disposed between adjacent cover portions 23. Specifically, the heat radiation fin 26 is disposed between the cover portions 23 adjacent to each other in the X-axis direction. Therefore, the heat radiation fin 26 is disposed between the openings 25 adjacent to each other in the X-axis direction. In addition, the heat radiation fin 26 may be disposed between the cover portions 23 adjacent to each other in the Y-axis direction. Therefore, the heat radiation fin 26 is disposed between the openings 25 adjacent to each other in the Y-axis direction. The heat radiation fin 26 is disposed in a vicinity of the opening 25.

The heat radiation fin 26 is a fin for radiating heat generated in the active component 50 to an outside. The heat radiation fin 26 transfers heat of the active component 50 being transferred from the first support portion 24 to the air, and thereby radiates the heat of the active component 50 to the outside of the antenna apparatus 100. In other words, the outside air removes the heat of the active component 50 being transferred from the first support portion 24 by touching a surface of the heat radiation fin 26, and radiates the heat to the outside.

A shape and the number of the heat radiation fins 26 may be determined by a heat generation condition of the antenna apparatus 100 and the active component 50. Specifically, the shape of the heat radiation fin 26 includes a height of the heat radiation fin 26 in the Z-axis direction and a length of the heat radiation fin 26 in the Y-axis direction. The heat radiation fin 26 may have a configuration in which it is omitted as long as it is unnecessary.

The second case 22 is disposed on the second surface 10*b* side of the conductive plate 10, that is, on the −Z-axis direction side of the conductive plate 10. The second case 22 includes a bottom portion 27 and a second support portion 28.

The bottom portion 27 is disposed apart from the feed line 12 and the short stub 14. When the antenna element 17 is formed in the feeder circuit 11, the bottom portion 27 may also be disposed apart from the antenna element 17. The bottom portion 27 includes a recessed portion 29 in a portion facing the feed line 12, the short stub 14, and the antenna element 17 of the conductive plate 10. As a result, the bottom portion 27 is separated from the feed line 12, the short stub 14, and the antenna element 17. The recessed portion 29 covers the feed line 12, the short stub 14, and the antenna element 17 from the −Z-axis direction side. The bottom portion 27 is transferred heat from the active component 50.

The second support portion 28 is disposed on the −Z-axis direction side of the ground portion 13. The second support portion 28 is connected to the ground portion 13. The second support portion 28 is connected to the bottom portion 27, and supports the bottom portion 27.

The heat transfer member 30 is connected to the −Z-axis direction side of the bottom portion 27. The heat transfer member 30 has thermal conductivity. The heat transfer member 30 may be a filter or a filter component. The heat transfer member 30 may be a high-frequency coaxial connection line. When the heat transfer member 30 is a filter, the heat transfer member 30 may be a radio frequency (RF) band pass filter configured with structure having high thermal conductivity.

The substrate 40 is connected to the −Z-axis direction side of the heat transfer member 30. The substrate 40 includes a first conductive layer 41, a second conductive layer 42, a base material 43, and a heat radiation via 44. The first conductive layer 41 is formed on a surface on a heat transfer member 30 side of the base material 43. The second conductive layer 42 is formed on the surface on an active component 50 side of the base material 43. The heat radiation via 44 penetrates the base material 43. A plurality of heat radiation vias 44 may be formed in the base material 43. The first conductive layer 41, the second conductive layer 42, and the heat radiation via 44 may include, for example, a metal material having conductivity and thermal conductivity. For example, the first conductive layer 41 and the second conductive layer 42 may include a copper foil. Each of the first conductive layer 41, the second conductive layer 42, and the heat radiation via 44 may include different materials from each other. Note that, the first conductive layer 41, the second conductive layer 42, and the heat radiation via 44 are not limited to materials including metal materials as long as they have conductivity and thermal conductivity.

The heat radiation via 44 connects the first conductive layer 41 and the second conductive layer 42 to each other. The heat radiation via 44 may be disposed in a region of the base material 43 to which the heat transfer member 30 is connected. As a result, the thermal conductivity from the active component 50 to the bottom portion 27 of the second case 22 can be improved. In other words, in the bottom portion 27, heat from the active component 50 is transferred via the second conductive layer 42, the heat radiation via 44, the first conductive layer 41, and the heat transfer member 30. The heat radiation via 44 is configured as a heat radiation path, and transfers heat generated by the active component 50 to the radome 20 and the conductive plate 10.

The active component 50 is connected to the −Z-axis direction side of the substrate 40. Therefore, the heat transfer member 30 and the substrate 40 are disposed in this order from the bottom portion 27 side between the bottom portion 27 and the active component 50. The active component 50 includes a component that generates heat. The active component 50 may include, for example, an amplifier (AMP) or the like, or may include an active device such as a transistor.

The same number of active components 50 as the number of the feeder circuits 11 may be connected to a surface on the −Z-axis direction side of the substrate 40. Each active component 50 may be disposed at a position associated to each antenna element 17. The active component 50 is thermally connected to the conductive plate 10 via the substrate 40, the heat transfer member 30, and the second case 22. Therefore, the active component 50 may be thermally connected to the feeder circuit 11 such as the antenna element 17 via these members. The active component 50 is further thermally connected to the first case 21 via the conductive plate 10.

The active component 50 may be electrically connected to the antenna element 17 via the substrate 40, the heat transfer member 30, the second case 22, the ground portion 13, the short stub 14, and the feed line 12. Note that, the active component 50 may be connected to an external circuit not illustrated in FIG. 2.

Figure 5:
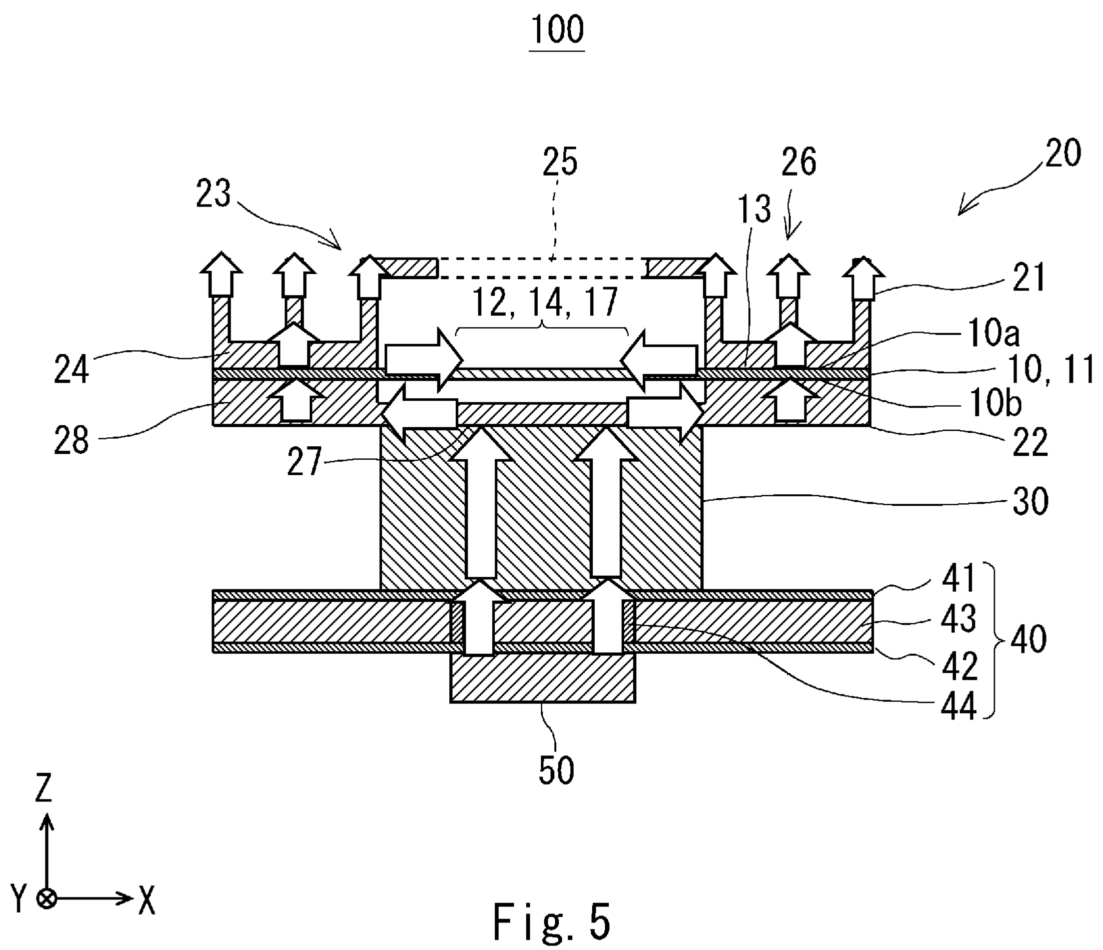
FIG. 5 is a cross-sectional view illustrating a flow of heat radiation in the antenna apparatus according to the first example embodiment.

Next, a flow of heat radiation in the antenna apparatus 100 will be described with reference to FIG. 5. FIG. 5 is a cross-sectional view illustrating a flow of heat radiation in the antenna apparatus 100 according to the first example embodiment. FIG. 5 is a diagram being added, to the cross-sectional view illustrated in FIG. 2, a white arrow indicating a flow of heat generated by the active component 50. As illustrated in FIG. 5, heat generated from an active device such as a transistor in the active component 50 is transferred to the heat transfer member 30 via the second conductive layer 42, the heat radiation via 44, and the first conductive layer 41 of the substrate 40. Then, the heat transferred to the heat transfer member 30 is transferred from the second case 22 to the feeder circuit 11. Further, the heat transferred to the feeder circuit 11 is transferred to the first case 21, and is radiated to the air via the heat radiation fin 26.

The feeder circuit 11 is formed on the conductive plate 10 including a metal material or the like. In particular, the ground portion 13 is in contact with the first case 21 and the second case 22 including a metal material or the like. Therefore, the antenna apparatus 100 according to the present example embodiment can improve heat conductive capability as compared with a case where the feeder circuit 11 is formed on a printed substrate. Further, since the ground portion 13, and the feed line 12 and the antenna element 17 are connected to each other via the short stub 14, heat radiation can also be performed from the feed line 12 and the antenna element 17.

Next, an advantageous effect of the present example embodiment will be described. In the present example embodiment, for example, in the antenna apparatus 100 serving as an antenna-integrated base station apparatus, the feeder circuit 11 that supplies electric power to the antenna element 17 is configured by the conductive plate 10 such as a metal plate. Therefore, heat generated from the active component 50 can be distributed to the entire feeder circuit 11, and heat radiation can be improved.

The ground portion 13 of the feeder circuit 11 is thermally connected to the active component 50 such as an active device, and heat generated from the active component 50 is radiated to the outside via the feeder circuit 11. Since the feeder circuit 11 is formed of the conductive plate 10 having high thermal conductivity, it is possible to conduct heat from the entire feeder circuit 11. In addition, the feed line 12 has stripline structure surrounded by the ground portion 13, the internal ground portion 16, the cover portion 23, and the bottom portion 27. As described above, by using the stripline structure for the feed line 12 in the feeder circuit 11, it is possible to further improve the heat radiation efficiency.

The first case 21 includes the heat radiation fin 26. As a result, since heat can be radiated to the outside via the heat radiation fin 26, heat radiation can be improved.

An antenna apparatus of International Patent Publication No. WO2022/176285 is configured to radiate heat to a metal radome via a through-hole of a substrate forming a patch antenna and a feeder circuit. The substrate is a printed substrate on which a feed line is printed. In contrast, in the present example embodiment, the feeder circuit 11 including the antenna element 17 is configured by the conductive plate 10 such as a metal plate having high thermal conductivity. Therefore, heat transfer efficiency to the heat radiation fin 26 can be improved, the heat radiation performance of the antenna apparatus 100 can be improved, and thereby it is contributed to decrease in size of the antenna apparatus 100.

Second Example Embodiment

Figure 6:
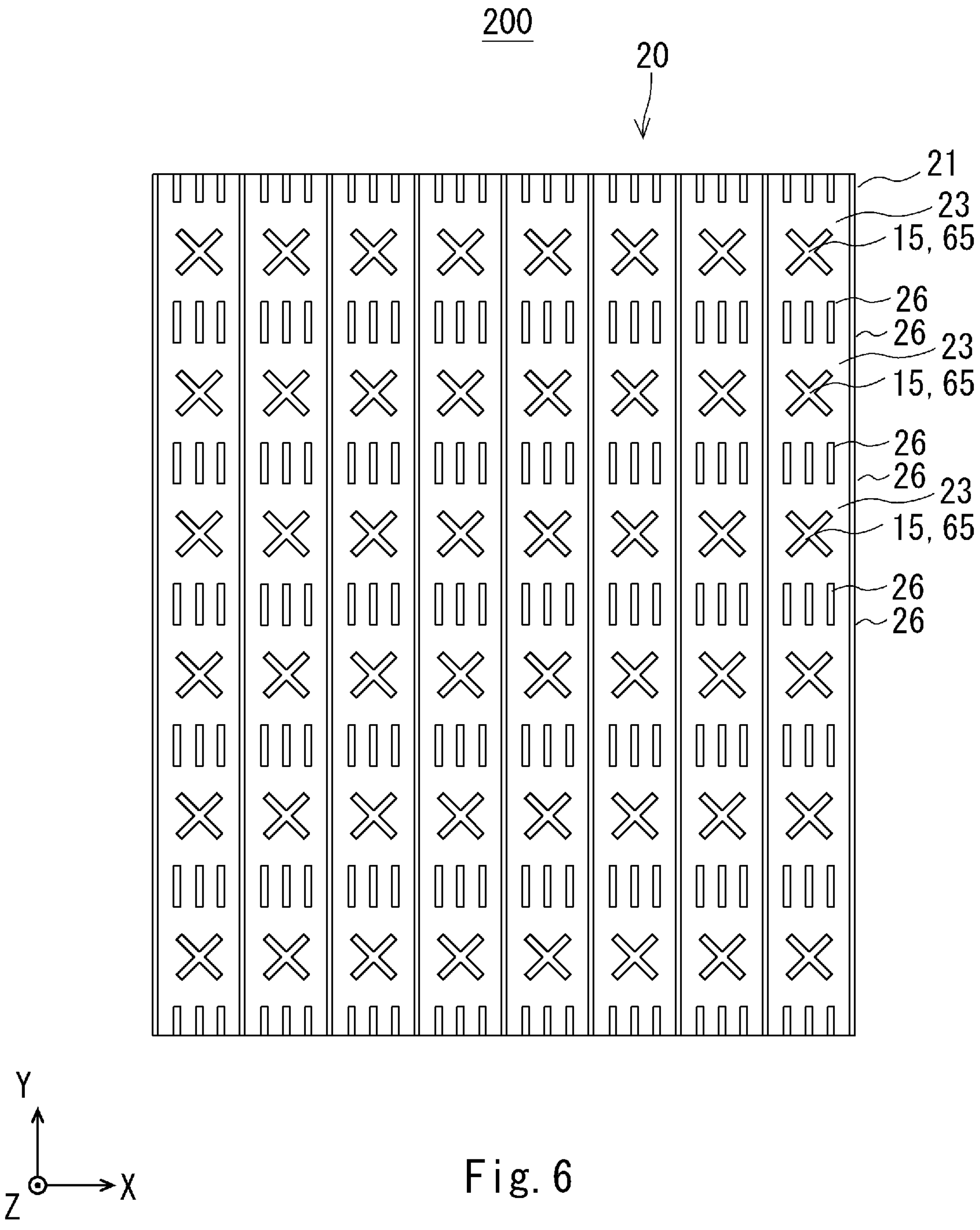
FIG. 6 is a top view illustrating an antenna apparatus according to a second example embodiment.
Figure 7:
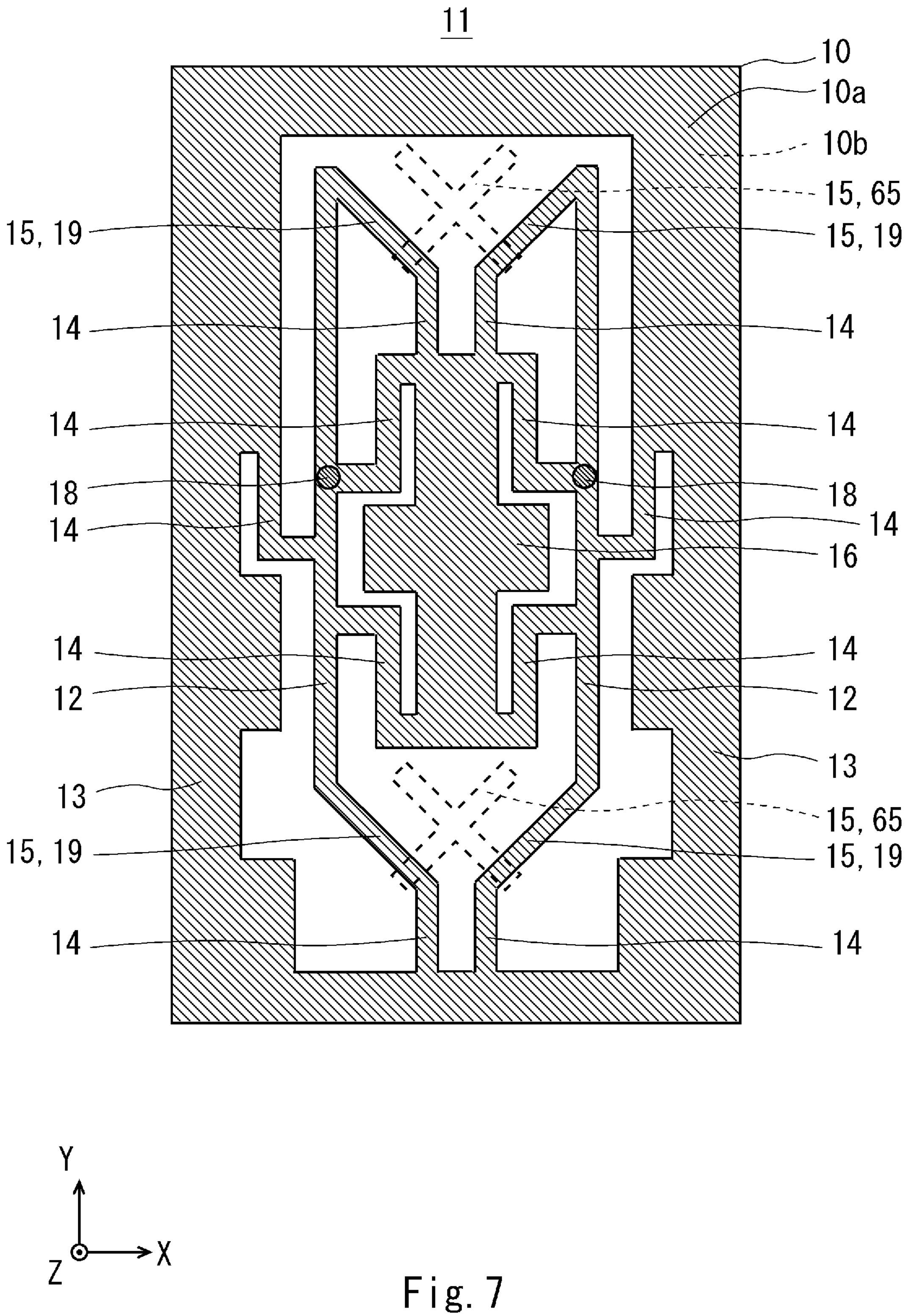
FIG. 7 is a plan view illustrating a feeder circuit according to the second example embodiment.

Next, an antenna apparatus according to a second example embodiment will be described. In the antenna apparatus of the present example embodiment, an aperture antenna is disposed in a first case 21 as an antenna member 15. In the antenna apparatus of the present example embodiment, an antenna element 17 is not formed on a conductive plate 10. FIG. 6 is a top view illustrating an antenna apparatus 200 according to the second example embodiment. FIG. 7 is a plan view illustrating a feeder circuit 11 according to the second example embodiment.

As illustrated in FIGS. 6 and 7, in the antenna apparatus 200, the feeder circuit 11 includes a feed line 12, a ground portion 13, a short stub 14, an internal ground portion 16, a feed point 18, and an antenna stub 19. A cover portion 23 of a first case 21 includes a slot 65. The antenna member 15 according to the present example embodiment includes the antenna stub 19 and the slot 65. The antenna stub 19 includes the short stub 14 being connected to the feed line 12. The slot 65 is opened at a position facing to the antenna stub 19 in the cover portion 23 of the first case 21. For example, the slot 65 is opened in a cross-slot shape. As a result, the slot 65 functions as an aperture antenna including a cross-slot shape. The feeder circuit 11 includes, as the antenna stub 19, the short stub 14 having a length of a quarter of a wavelength immediately below the slot 65 functioning as the aperture antenna. Therefore, by such a configuration, the antenna member 15 of the present example embodiment has structure that the antenna stub 19 excites the slot 65.

Figure 8:
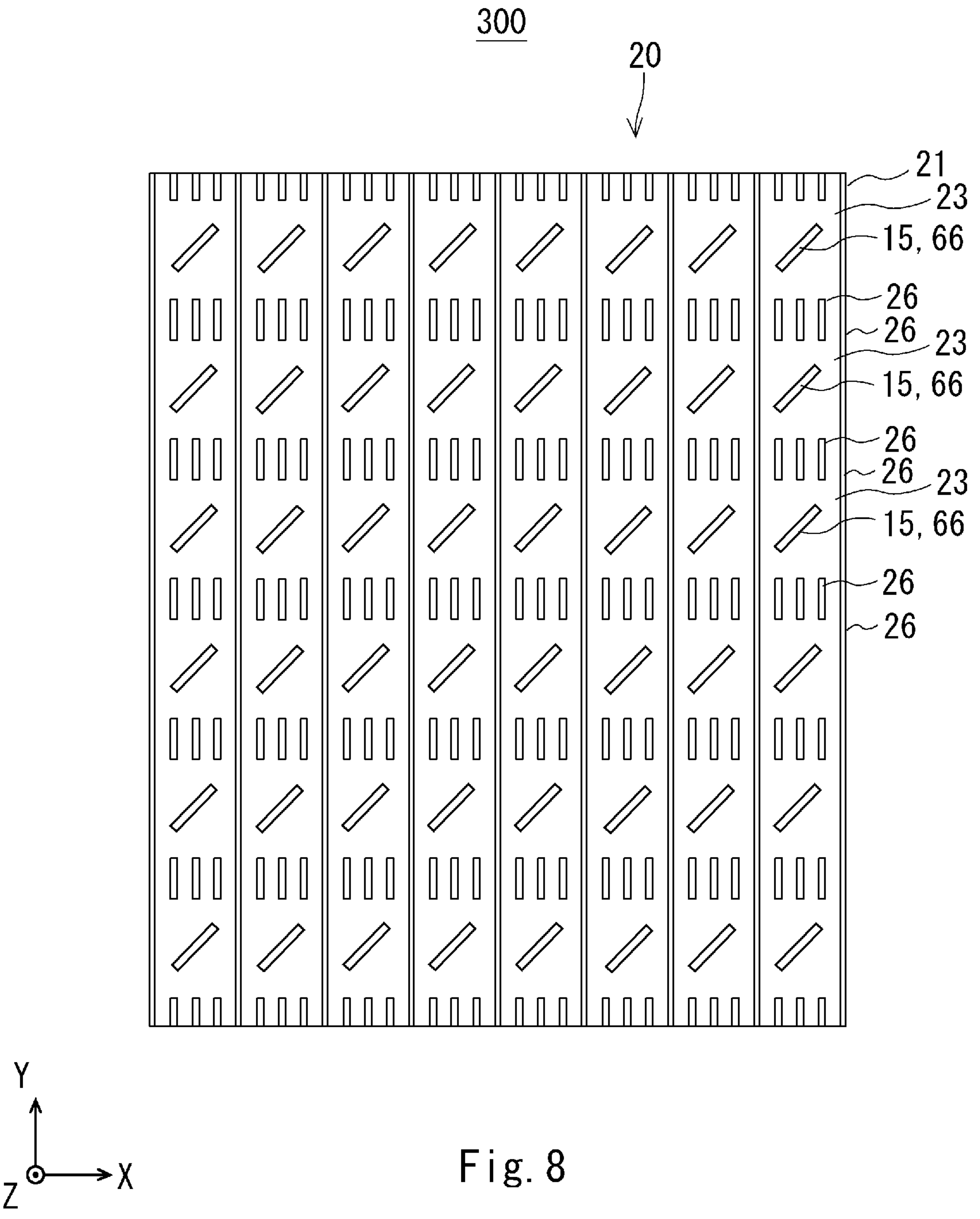
FIG. 8 is a top view illustrating an antenna apparatus according to another example of the second example embodiment.
Figure 9:
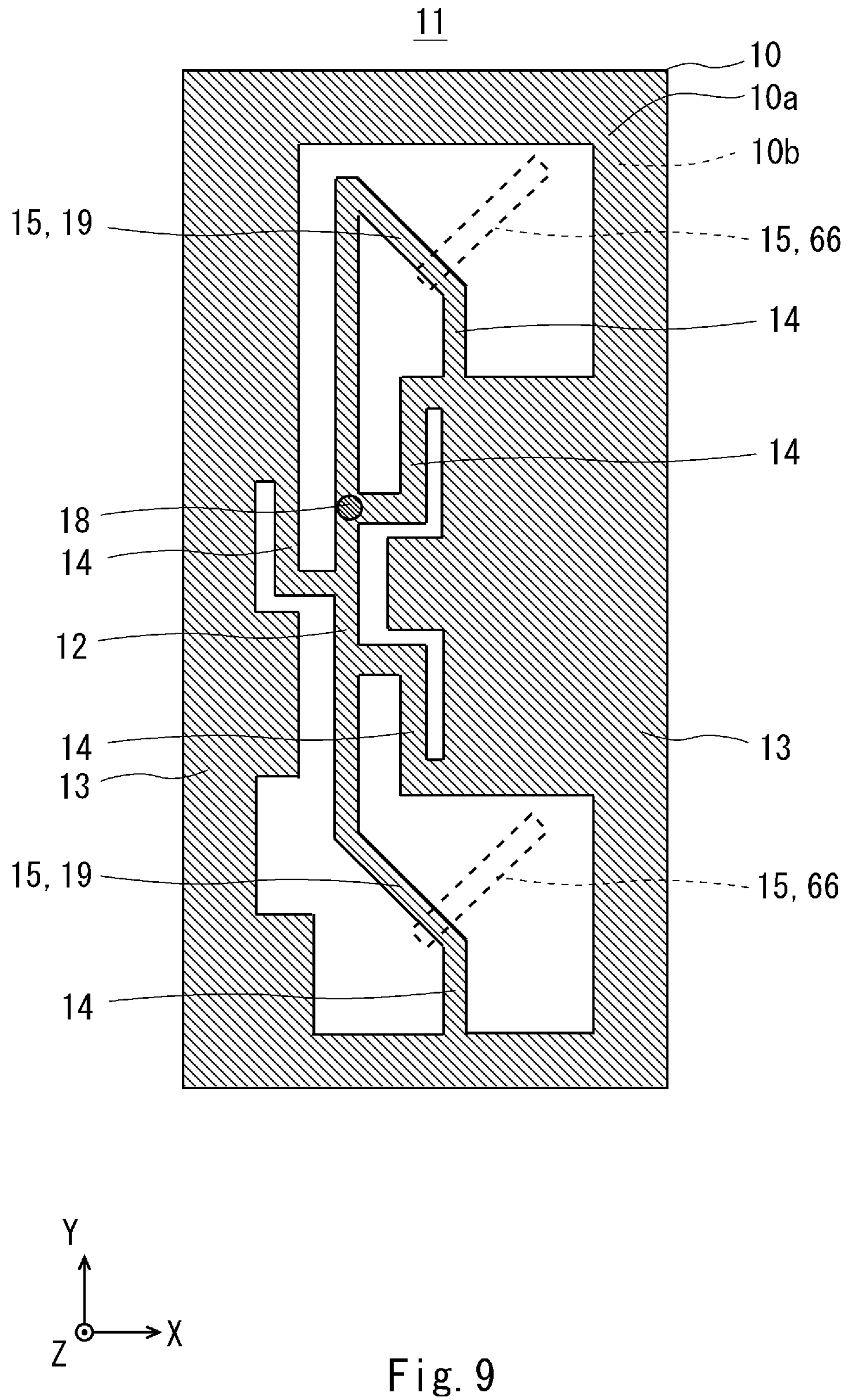
FIG. 9 is a plan view illustrating a feeder circuit according to the another example of the second example embodiment.

FIG. 8 is a top view illustrating an antenna apparatus 300 according to another example of the second example embodiment. FIG. 9 is a plan view illustrating a feeder circuit 11 according to the another example of the second example embodiment. The antenna apparatus 200 in FIGS. 6 and 7 described above is illustrated as an example having the cross-slot shaped slot 65 for dual polarization. However, as in the example in FIGS. 8 and 9, the antenna apparatus 300 may include a dipole-shaped slot 66, and have a slot dipole antenna configuration of only one polarization.

According to the present example embodiment, the slots 65 and 66 can be used as the antenna member 15 instead of the antenna element 17. As a result, a degree of freedom of a radio wave used by the antenna apparatuses 200 and 300 can be improved. In addition, since an area of the first case 21 can be made larger than in a case where the opening 25 is provided in the first case 21 of the first example embodiment, heat radiation can be improved. Other configurations and advantageous effects are included in the description of the first example embodiment.

Note that, the present disclosure is not limited to the above-described example embodiments, and can be appropriately modified without departing from the scope of the present disclosure. For example, an antenna apparatus combining each configuration of the first and second example embodiments is also within the scope of the technical idea of the present disclosure.

In addition, some or all of the above-described example embodiments may be described as the following supplementary notes, but are not limited thereto.

(Supplementary Note 1)

An antenna apparatus including:

a conductive plate configured to include a feed circuit; and a radome configured to include first case being disposed on a first surface side of the conductive plate and having thermal conductivity, and a second case being disposed on a second surface side on an opposite side of the first surface and having thermal conductivity, wherein the feeder circuit includes a feed line being connected to an antenna member, and a ground portion surrounding the feed line and being connected to the feed line via a short stub, the first case includes a cover portion being disposed apart from the feed line and the short stub, and a first support portion being connected to the ground portion and including a heat radiation fin, and the second case includes a bottom portion being disposed apart from the feed line and the short stub and transferring heat from an active component, and a second support portion being connected to the ground portion.

(Supplementary Note 2)

The antenna apparatus according to supplementary note 1, wherein

The conductive plate includes a plurality of the feeder circuits, the first case includes a plurality of the cover portion and a plurality of heat radiation fins, and each of the heat radiation fins is disposed between the adjacent cover portions.

(Supplementary Note 3)

The antenna apparatus according to supplementary note 1 or 2, wherein the feeder circuit further includes a plurality of the feed lines, and an internal ground portion being disposed between the feed lines, the first support portion is connected to the internal ground portion, and the feed line has stripline structure surrounded by the ground portion, the internal ground portion, the cover portion, and the bottom portion.

(Supplementary Note 4)

The antenna apparatus according to supplementary note 1 or 2, wherein a heat transfer member and a substrate are disposed from the bottom portion side between the bottom portion and the active component, the substrate includes a base material, a first conductive layer being formed on a surface on the heat transfer member side of the base material, a second conductive layer being formed on a surface on the active component side of the base material, and a heat radiation via penetrating the base material and connecting the first conductive layer and the second conductive layer to each other, and, in the bottom portion, heat from the active component is transferred via the second conductive layer, the heat radiation via, the first conductive layer, and the heat transfer member.

(Supplementary Note 5)

The antenna apparatus according to supplementary note 4, wherein the active component includes at least one of an amplifier (AMP) and a transistor, and the heat transfer member includes at least one of a filter and a high-frequency coaxial connection line.

(Supplementary Note 6)

The antenna apparatus according to supplementary note 1 or 2, wherein the antenna member includes an antenna element being connected to the feed line, and the cover portion has an opening being formed at a position facing the antenna element.

(Supplementary Note 7)

The antenna apparatus according to supplementary note 1 or 2, wherein the antenna member includes an antenna stub including the short stub being connected to the feed line, and a slot being opened at a position facing the antenna stub in the cover portion.

(Supplementary Note 8)

The antenna apparatus according to supplementary note 7, wherein the slot includes a cross-slot shape or a dipole shape.

(Supplementary Note 9)

The antenna apparatus according to supplementary note 1 or 2, wherein the conductive plate includes a metal plate.

(Supplementary Note 10)

A radome including:

a first case configured to be disposed on a first surface side of a conductive plate having a feeder circuit and have thermal conductivity; and a second case configured to be disposed on a second surface side on an opposite side of the first surface and have thermal conductivity, wherein the feeder circuit includes a feed line being connected to an antenna member, and a ground portion surrounding the feed line and being connected to the feed line via a short stub, the first case includes a cover portion being disposed apart from the feed line and the short stub, and a first support portion being connected to the ground portion and including a heat radiation fin, and the second case includes a bottom portion being disposed apart from the feed line and the short stub and transferring heat from an active component, and a second support portion being connected to the ground portion.

(Supplementary Note 11)

The radome according to supplementary note 10, wherein the conductive plate includes a plurality of the feeder circuits, the first case includes a plurality of the cover portions and a plurality of heat radiation fins, and each of the heat radiation fins is disposed between the adjacent cover portions.

(Supplementary Note 12)

The radome according to supplementary note 10 or 11, wherein the feeder circuit further includes a plurality of the feed lines, and an internal ground portion being disposed between the feed lines, the first support portion is connected to the internal ground portion, and the feed line has stripline structure surrounded by the ground portion, the internal ground portion, the cover portion, and the bottom portion.

(Supplementary Note 13)

The radome according to supplementary note 10 or 11, wherein a heat transfer member and a substrate are disposed from the bottom portion side between the bottom portion and the active component, the substrate includes a base material, a first conductive layer being formed on a surface on the heat transfer member side of the base material, a second conductive layer being formed on a surface on the active component side of the base material, and a heat radiation via penetrating the base material and connecting the first conductive layer and the second conductive layer to each other, and, in the bottom portion, heat from the active component is transferred via the second conductive layer, the heat radiation via, the first conductive layer, and the heat transfer member.

(Supplementary Note 14)

The radome according to supplementary note 13, wherein the active component includes at least one of an amplifier (AMP) and a transistor, and the heat transfer member includes at least one of a filter and a high-frequency coaxial connection line.

(Supplementary Note 15)

The radome according to supplementary note 10 or 11, wherein the antenna member includes an antenna element being connected to the feed line, and the cover portion has an opening being formed at a position facing the antenna element.

(Supplementary Note 16)

The radome according to supplementary note 10 or 11, wherein the antenna member includes an antenna stub including the short stub being connected to the feed line, and a slot being opened at a position facing the antenna stub in the cover portion.

(Supplementary Note 17)

The radome according to supplementary note 16, wherein the slot includes a cross-slot shape or a dipole shape.

(Supplementary Note 18)

The radome according to supplementary note 10 or 11, wherein the conductive plate includes a metal plate.

According to the present disclosure, it is possible to provide an antenna apparatus and a radome that are capable of improving heat radiation.

The first and second example embodiments can be combined as desirable by one of ordinary skill in the art.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

What is claimed is:

1. An antenna apparatus comprising:

a conductive plate configured to include a feeder circuit; and a radome configured to include a first case being disposed on a first surface side of the conductive plate and having thermal conductivity, and a second case being disposed on a second surface side on an opposite side of the first surface and having thermal conductivity, wherein the feeder circuit includes a feed line being connected to an antenna member, and a ground portion surrounding the feed line and being connected to the feed line via a short stub, the first case includes a cover portion being disposed apart from the feed line and the short stub, and a first support portion being connected to the ground portion and including a heat radiation fin, and the second case includes a bottom portion being disposed apart from the feed line and the short stub and transferring heat from an active component, and a second support portion being connected to the ground portion.

2. The antenna apparatus according to claim 1, wherein the conductive plate includes a plurality of the feeder circuits, the first case includes a plurality of the cover portions and a plurality of heat radiation fins, and each of the heat radiation fins is disposed between the adjacent cover portions.

3. The antenna apparatus according to claim 1, wherein the feeder circuit further includes a plurality of the feed lines, and an internal ground portion being disposed between the feed lines, the first support portion is connected to the internal ground portion, and the feed line has stripline structure surrounded by the ground portion, the internal ground portion, the cover portion, and the bottom portion.

4. The antenna apparatus according to claim 1, wherein a heat transfer member and a substrate are disposed from the bottom portion side between the bottom portion and the active component, the substrate includes a base material, a first conductive layer being formed on a surface on the heat transfer member side of the base material, a second conductive layer being formed on a surface on the active component side of the base material, and a heat radiation via penetrating the base material and connecting the first conductive layer and the second conductive layer to each other, and, in the bottom portion, heat from the active component is transferred via the second conductive layer, the heat radiation via, the first conductive layer, and the heat transfer member.

5. The antenna apparatus according to claim 4, wherein the active component includes at least one of an amplifier (AMP) and a transistor, and the heat transfer member includes at least one of a filter and a high-frequency coaxial connection line.

6. The antenna apparatus according to claim 1, wherein the antenna member includes an antenna element being connected to the feed line, and the cover portion has an opening being formed at a position facing the antenna element.

7. The antenna apparatus according to claim 1, wherein the antenna member includes an antenna stub including the short stub being connected to the feed line, and a slot being opened at a position facing the antenna stub in the cover portion.

8. The antenna apparatus according to claim 7, wherein the slot includes a cross-slot shape or a dipole shape.

9. The antenna apparatus according to claim 1, wherein the conductive plate includes a metal plate.

10. A radome comprising:

a first case configured to be disposed on a first surface side of a conductive plate having a feeder circuit and have thermal conductivity; and a second case configured to be disposed on a second surface side on an opposite side of the first surface and have thermal conductivity, wherein the feeder circuit includes a feed line being connected to an antenna member, and a ground portion surrounding the feed line and being connected to the feed line via a short stub, the first case includes a cover portion being disposed apart from the feed line and the short stub, and a first support portion being connected to the ground portion and including a heat radiation fin, and the second case includes a bottom portion being disposed apart from the feed line and the short stub and transferring heat from an active component, and a second support portion being connected to the ground portion.

11. The radome according to claim 10, wherein the conductive plate includes a plurality of the feeder circuits, the first case includes a plurality of the cover portions and a plurality of heat radiation fins, and each of the heat radiation fins is disposed between the adjacent cover portions.

12. The radome according to claim 10, wherein the feeder circuit further includes a plurality of the feed lines, and an internal ground portion being disposed between the feed lines, the first support portion is connected to the internal ground portion, and the feed line has stripline structure surrounded by the ground portion, the internal ground portion, the cover portion, and the bottom portion.

13. The radome according to claim 10, wherein a heat transfer member and a substrate are disposed from the bottom portion side between the bottom portion and the active component, the substrate includes a base material, a first conductive layer being formed on a surface on the heat transfer member side of the base material, a second conductive layer being formed on a surface on the active component side of the base material, and a heat radiation via penetrating the base material and connecting the first conductive layer and the second conductive layer to each other, and, in the bottom portion, heat from the active component is transferred via the second conductive layer, the heat radiation via, the first conductive layer, and the heat transfer member.

14. The radome according to claim 13, wherein the active component includes at least one of an amplifier (AMP) and a transistor, and the heat transfer member includes at least one of a filter and a high-frequency coaxial connection line.

15. The radome according to claim 10, wherein the antenna member includes an antenna element being connected to the feed line, and the cover portion has an opening being formed at a position facing the antenna element.

16. The radome according to claim 10, wherein the antenna member includes an antenna stub including the short stub being connected to the feed line, and a slot being opened at a position facing the antenna stub in the cover portion.

17. The radome according to claim 16, wherein the slot includes a cross-slot shape or a dipole shape.

18. The radome according to claim 10, wherein the conductive plate includes a metal plate.

* * * * *